United States Patent [19]

Dattilo

[11] 3,869,725

[45] Mar. 4, 1975

[54] COMBINATION END OF TAPE SENSOR AND TAPE GUIDE DEVICE

[75] Inventor: Donald J. Dattilo, Mount Prospect, Ill.

[73] Assignee: Motorola, Inc., Chicago, Ill.

[22] Filed: Sept. 17, 1973

[21] Appl. No.: 398,117

[52] U.S. Cl. .................. 360/130, 360/106, 360/137

[51] Int. Cl. ....................... G11b 15/60, G11b 21/08

[58] Field of Search ............... 179/100.2 S, 100.2 Z; 360/137, 130

[56] References Cited

UNITED STATES PATENTS

| | | | |
|---|---|---|---|
| 3,532,347 | 10/1970 | Parsons | 179/100.2 Z |
| 3,599,987 | 8/1971 | Ban | 179/100.2 Z |

FOREIGN PATENTS OR APPLICATIONS

| | | | |
|---|---|---|---|
| 16,344 | 12/1968 | Japan | 360/130 |

*Primary Examiner*—Terrell W. Fears
*Assistant Examiner*—Robert S. Tupper
*Attorney, Agent, or Firm*—Donald J. Lisa; Vincent J. Rauner

[57] ABSTRACT

A combination end of tape sensor and tape guide device includes a first electrode mounted on the tape deck portion of a cartridge tape player and is grounded therethrough. The first electrode includes a pair of outwardly extending parallel arms for receiving a magnetic recording tape therebetween for guiding the tape past an adjacent magnetic tape head. A second electrode is coupled to the first electrode with an insulative layer provided therebetween. The second electrode is connected through the solenoid of a tape head indexing assembly to a positive potential. Simultaneous contact of the electrodes by an end of track metal strip on the recording tape completes a circuit therebetween to activate the tape head indexing assembly of the player for repositioning the magnetic tape head with respect to the recording tape.

3 Claims, 4 Drawing Figures

PATENTED MAR 4 1975 3,869,725

COMBINATION END OF TAPE SENSOR AND TAPE GUIDE DEVICE

BACKGROUND

This invention relates generally to cartridge type tape players and more particularly to the tape guide and end of track sensor found therein.

Conventionally, there is provided in a cartridge type tape player, an end of tape sensor comprised of a pair of electrodes between which is sandwiched an insulative member. One of the sensor electrodes is connected to ground or negative potential and the other to a positive potential. The sensor is mounted in communication with the cartridge receiving cavity of the player for engagement at the free ends of the electrodes with a recording tape which is driven through a tape cartridge inserted into the cavity. The sensor actuates the solenoid of a magnetic tape head indexing assembly in the player upon being contacted at both electrodes by a piece of metallic foil provided on the tape and located at the end of the multiple tape tracks thereon. The indexing assembly in turn repositions the tape head with respect to the tape tracks.

Also included in the player is a tape guide member which is normally located adjacent the magnetic tape head. The tape guide includes a pair of outwardly extending arms between which the recording tape driven through the tape cartridge passes. The guide ensures the alignment of the moving tape with the magnetic pick-ups of the magnetic tape head during playback of information recorded on the tape.

To provide both the end of tape sensor and tape guide in the player requires fabricating both devices individually and mounting them separately in the player at proper locations. This increases the cost of the player. Furthermore, having both the devices mounted in the player requires space which could otherwise be used for other important purposes. In addition, by employing a separate end of tape sensor and tape guide, considerable friction is applied against the moving tape which may cause premature tape wear, slippage and capstan shaft wear.

SUMMARY

Accordingly, it is a primary object of the present invention to provide in a cartridge tape player the necessary end of tape sensor and tape guide functions while overcoming the drawbacks associated with prior art devices.

It is another object of the present invention to provide in a cartridge tape player a new and improved device which accomplishes the end of tape sensing and tape guide functions, but which requires a relatively small amount of space in the player, is relatively simple in construction and is less expensive, both to fabricate and assemble, than the prior art separate end of tape sensor and tape guide devices.

Briefly, a preferred embodiment of a combination end of tape sensor and tape guide device according to the invention comprises a first electrode mounted on the base wall of a cartridge tape player housing with one end thereof extending into the cavity into which a cartridge is inserted for playback. The electrode is aligned with an aperture in the front wall of a cartridge received in the cavity and passes therethrough into the cartridge for engagement with the magnetic recording tape therein. The first electrode is elongated and includes two parallel arms spaced from each other a predetermined distance to permit the tape to travel therebetween for guiding the tape past the magnetic pickups of a magnetic tape head mounted adjacent the electrode. A second electrode is attached to the first electrode, but is electrically insulated therefrom by an insulative spacer. The second electrode is shorter in length than the first electrode. The free end of the second electrode is also in contacting engagement with the tape passing through the cartridge. Each of the electrodes is at a different electrical potential. When a metallic foil section marking the end of the tape tracks passes the electrodes in simultaneous contacting relation therewith, a circuit is completed for actuating a tape head indexing solenoid for repositioning the tape head with respect to the tape tracks.

DETAILED DESCRIPTION

Figure 1:
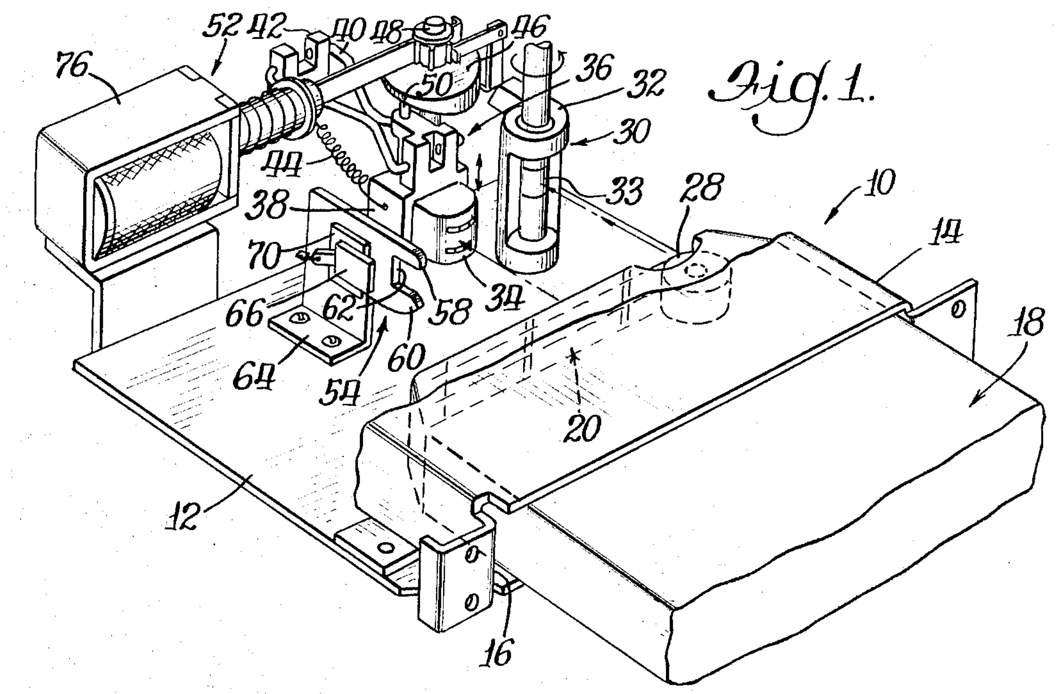
FIG. 1 is a perspective view of the tape deck portion of a cartridge tape player shown receiving a tape cartridge and including a combination tape guide and end of tape sensor device according to the invention.
Figures 2, 3, 4:
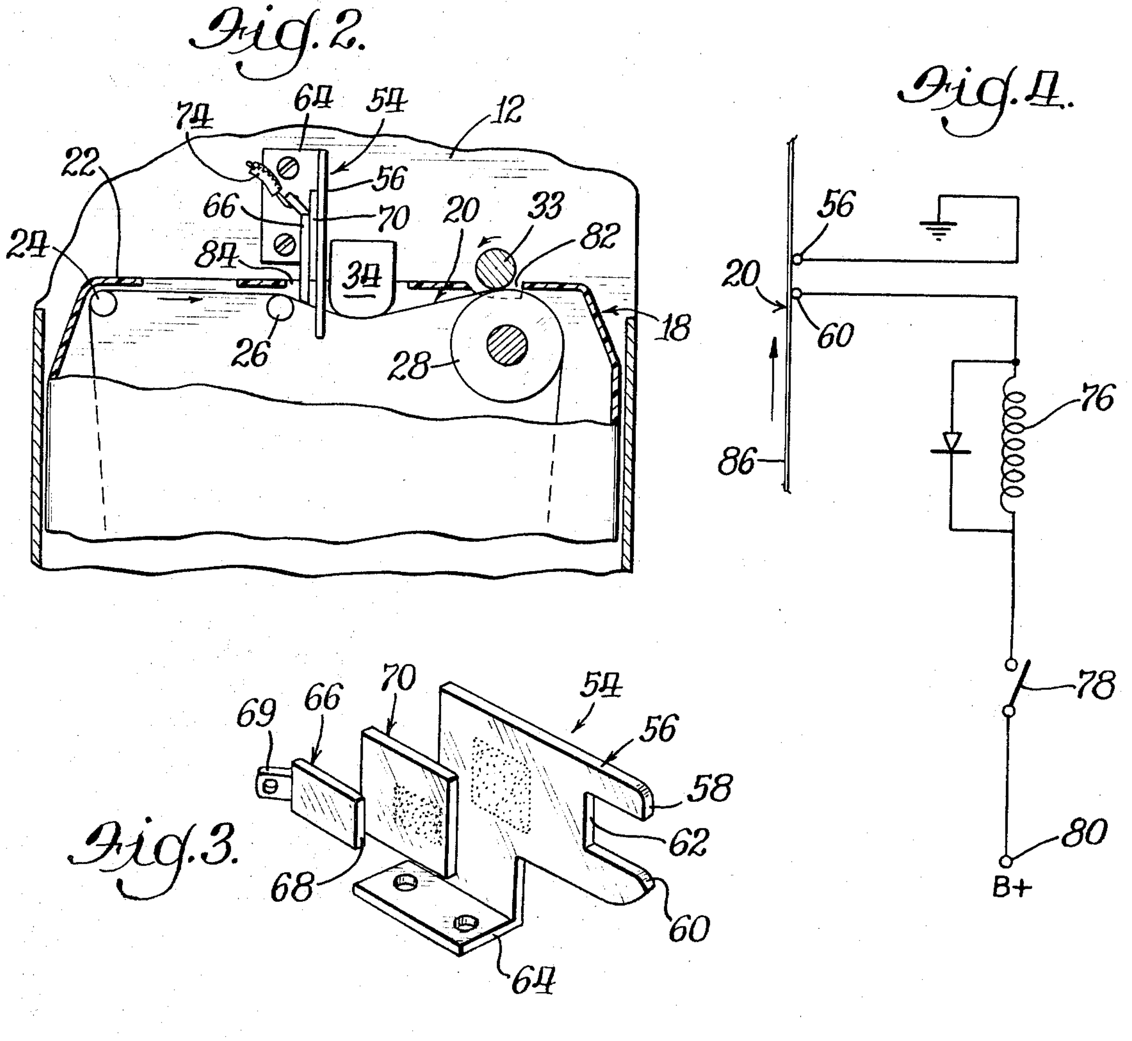
FIG. 2 is a top, plan view of the tape deck of FIG. 1 shown with the tape cartridge in a fully inserted position therein.
FIG. 3 is an enlarged, exploded perspective view of the combination tape guide and end of tape sensor device according to the invention.
FIG. 4 is a circuit diagram showing the electrical connection of the combination tape guide and end of tape sensor for operating the tape head indexing solenoid according to the invention.

Referring now to the drawing in greater detail wherein like numerals are employed throughout the various views to designate similar components, there is illustrated in FIG. 1 a tape deck portion 10 of a cartridge type tape player. The tape deck portion includes the usual base wall 12 upon which there is mounted a U-shaped member 14 which, with the base wall, forms a cartridge receiving tunnel 16 wherein a multi-track tape cartridge 18 of the conventional type is received for playing back information recorded on the magnetic tape 20 provided therein. The tape, as shown in FIG. 2, passes through the cartridge 18 along a path parallel to the front wall 22 of the cartridge. The tape is guided by guide pins such as 24, 26 and a pressure or guide roller 28 mounted within the cartridge as shown in FIG. 2.

Mounted also on the base wall 12 of the tape deck portion 10 of the player is a tape drive capstan assembly 30 (FIG. 1). The last-mentioned assembly includes a capstan bearing housing 32 and a capstan drive shaft 34 mounted in the housing. A flywheel (not shown) is mounted on the capstan drive shaft and is driven by a belt and motor assembly (not shown) to rotate the capstan in the direction indicated by the arrow for driving the tape 20 through cartridge 18 upon inserting the cartridge into the tape deck portion with the pressure roller 28 and capstan in driving engagement.

Adjacent the capstan drive assembly there is provided a magnetic tape head 34 and tape head indexing assembly 36. In the particular embodiment shown, the tape head 34 is mounted in a first bracket 38 which is coupled via pivotally mounted arm arrangement 40 to a second stationary bracket 42. A spring 44 extending between the brackets biases the tape head upwardly toward a rotatable indexing cam wheel 46 mounted adjacent the tape head bracket 38 on an upstanding shaft 48. The cam wheel 46 has a plurality of cam surfaces thereon which when engaged with a cam follower pin 50 extending from bracket 38, moves the tape head to various positions with respect to the tape tracks or channels on the magnetic recording tape in the cartridge. A solenoid driven pawl and ratchet arrangement 52 rotates the cam wheel 46 to position different ones of the cam surfaces into engagement with the cam follower pin 50 to index the tape head properly.

Adjacent the tape head 34 on the side thereof opposite the capstan drive assembly 30 there is provided a preferred embodiment of a combination tape guide and end of tape sensor device 54 according to the invention.

The device 54 includes a first electrode 56 which is elongated in the direction of an incoming cartridge in the tape deck portion and has at one end thereof a pair of outwardly extending parallel arms 58, 60 spaced from each other predeterminedly to permit the magnetic recording tape in the cartridge to pass therebetween with the surface of the tape facing toward the portion 62 of the electrode extending between the arms 58, 60. The electrode 56 is L-shaped having a base portion 64 for mounting the electrode on the base wall 12 of the tape deck portion. The mounting of the electrode is accomplished by riveting or screwing the base portion 64 to base wall 12, (See FIG. 1).

A second electrode 66 is attached to the first electrode in parallel alignment therewith. The end 68 is generally aligned with the portion 62 of the first electrode so that both portion 62 and end 68 will be in contacting relation with the surface of tape 20 when cartridge 18 is inserted into the player and the tape is being driven therethrough. Portion 62 and end 68 may be curved and smooth to avoid damage to the tape as the latter passes over the electrodes. A tab connector 69 is formed integrally with electrode 66 and extends outwardly therefrom at the end thereof opposite end 68. The tab permits making an electrical connection to electrode 66 through a wire lead such as 74. An insulator 70 is positioned between the electrodes 56, 66 to prevent the latter from contacting each other. Suitable bonding material may be used to maintain the electrodes and insulator in a fixed relation as shown in FIGS. 1 and 2.

The electrical connections of the combination tape guide and sensor device 54 according to the invention are illustrated in FIG. 4. The first electrode 56 of the device is connected to ground potential preferably through the tape deck base wall 12. The other electrode 66 is connected via wire 74 (FIG. 2) to the solenoid coil 76 of the tape head indexing assembly 52. The solenoid is in turn connected through a switch 78 to a power source 80.

In operation, when a tape cartridge 18 is inserted into the tunnel of tape deck portion 10 of the player in a fully inserted position, capstan drive shaft 33 engages pressure roller 28 through an opening 82 in the front wall 22 of cartridge 18 for driving the magnetic recording tape 20 therebetween, through the cartridge. Also, tape head 34 and the combination tape guide and end of tape sensor device 54 enter the cartridge through a second opening 84 in wall 22. Upon entering the cartridge, tape head 34 engages the exposed surface of the tape and the tape is received between the parallel arms 58, 60 of electrode 56 of the device 54. The arms 58, 60 hold the tape in position for travel along a predetermined path to ensure proper alignment of the tape with the tape head. The surface of tape 20 is likewise engaged by the end 68 of the second electrode 66 and portion 62 of electrode 56 of the device 54.

When switch 78 is closed, either by the insertion of cartridge 18 into the player or in some cases by manual operation, B+ is provided to one side of solenoid 76 of the tape head indexing assembly as shown in the circuit of FIG. 4, and to the tape drive motor (not shown) via another circuit (not shown), to drive the capstan 33 rotatably as shown.

Conventionally, at one area along the tape surface there is provided a metal foil or the like section 86 (See FIG. 4) which indicates the end of the tape tracks on the tape. Upon the latter section simultaneously engaging electrodes 56, 66 of the device 54, a circuit to solenoid 76 is completed and the solenoid is energized to rotate cam wheel 46 for indexing the tape head 34 with respect to the tape tracks or channels thereof. Once the foil section passes the electrodes of device 54, the solenoid is released.

The combination tape guide and end of tape sensor device 54 according to the invention provides a simple, easy to fabricate means for guiding a magnetic recording tape traveling through a tape cartridge, into alignment with a tape head positioned adjacent thereto as well as to serve as an end of tape sensor for operating the tape head indexing assembly of the player. The device is simple in construction, low cost and takes little space within the tape player, thus making it possible to have additional space for other needs therein.

While a particular embodiment of the invention has been shown and described, it should be understood that the invention is not limited thereto since many modifications may be made. It is therefore contemplated to cover by the present application any and all such modifications as fall within the true spirit and scope of the appended claims:

I claim:

1. In a cartridge tape player including a tape deck portion forming a cartridge receiving cavity wherein a tape cartridge is received for playback including a multi-track tape mounted therein for movement through the cartridge, said tape having a predetermined current conducting area indicating the end of said tape tracks, a magnetic tape head mounted in communication with said cartridge receiving cavity for engagement with the tape provided in a cartridge received in the cavity, tape head indexing means for positioning said tape head with respect to the various tracks on said tape and circuit means for operating said tape head indexing means, a combination end of tape sensor and tape guide mounted on said tape player in communication with said cartridge receiving cavity adjacent said tape head for contacting engagement with the tape provided in a cartridge received in said cavity, including in combination: a first electrode mounted in said tape player and having a major surface portion in a first plane, said major surface portion including a pair of parallel arms extending outward toward said tape cartridge, said arms spaced from each other predeterminedly and connected by a supporting portion to permit said tape to pass therebetween for engaging the tape in said cartridge between said arms to guide said tape past said tape head in alignment therewith, said supporting portion between said arms comprising the area of electrical contact between said first electrode and said current conducting tape area, a second electrode mechanically mounted to said first electrode and having an end portion and a major surface portion located within a plane all points of which are in a spaced relation to the first plane, said end portion being generally aligned with said supporting portion of said first electrode so that both said end portion and said supporting portion will be in contacting relation with the surface of said tape when said cartridge is fully inserted into said player and said tape is being driven therethrough, and insulating means provided between said first and second electrodes for electrically insulating the respective electrodes from one another as well as maintaining the electrodes in said spaced relation, said first and second electrodes being connected to said circuit means for actuation thereof upon simultaneously contacting said predetermined current conducting tape area for repositioning said tape head with respect to said tape.

2. A combination end of tape sensor and tape guide as claimed in claim 1 wherein said first electrode includes a base portion, said base portion being fastened to said tape deck portion, wherein said first electrode is grounded through said tape deck portion and wherein said second electrode is connected through said circuit means to a positive potential.

3. A combination end of tape sensor and tape guide as claimed in claim 2 wherein said insulating means is bonded to said first and second electrodes.

* * * * *